(12) United States Patent
Mori

(10) Patent No.: US 6,609,006 B1
(45) Date of Patent: Aug. 19, 2003

(54) MOBILE COMMUNICATION SYSTEM AND MOBILE TERMINAL

(75) Inventor: Daisuke Mori, Shizuoka (JP)

(73) Assignee: NEC Corporation, Tokyo (JP)

( * ) Notice: Subject to any disclaimer, the term of this patent is extended or adjusted under 35 U.S.C. 154(b) by 280 days.

(21) Appl. No.: 09/634,629

(22) Filed: Aug. 8, 2000

(30) Foreign Application Priority Data

Oct. 8, 1999 (JP) .......................................... 11-226200

(51) Int. Cl.⁷ ................................................ H04Q 7/20
(52) U.S. Cl. ...................... 455/466; 455/412; 455/414; 455/566; 370/338; 370/349
(58) Field of Search ................................ 455/466, 566, 455/575, 412, 413, 414; 709/206, 207; 370/338, 349

(56) References Cited

U.S. PATENT DOCUMENTS

| | | | | |
|---|---|---|---|---|
| 5,469,496 A | * | 11/1995 | Emery et al. ................ | 455/461 |
| 6,212,550 B1 | * | 4/2001 | Segur ........................... | 709/206 |
| 6,292,668 B1 | * | 9/2001 | Alanara et al. .............. | 455/466 |
| 6,304,753 B1 | * | 10/2001 | Hartmaier ................... | 455/413 |
| 6,363,412 B1 | * | 3/2002 | Niwa et al. .................. | 709/203 |
| 6,424,828 B1 | * | 7/2002 | Collins et al. ............... | 455/412 |
| 6,456,840 B1 | * | 9/2002 | Uda ............................. | 455/412 |

FOREIGN PATENT DOCUMENTS

| | | |
|---|---|---|
| JP | 7-99508 | 4/1995 |
| JP | 9-135298 | 5/1997 |
| JP | 9-247293 | 9/1997 |
| JP | 10-107901 A | 4/1998 |
| JP | 10-136091 | 5/1998 |
| JP | 11-196451 A | 7/1999 |

* cited by examiner

Primary Examiner—William Trost
Assistant Examiner—Sharad Rampuria
(74) Attorney, Agent, or Firm—Sughrue Mion, PLLC

(57) ABSTRACT

There is provided a mobile communication system for communication over a network between a first mobile terminal as a transmitter and a second mobile terminal as a receiver both having a function of packet communication and an e-mail address associated with a telephone number for text-communication, the first mobile terminal including (a) a calling unit which transmits a request to the network for registration of packet communication, in order to start text communication with the second mobile terminal, (b) a judgment unit which either selects text communication with the second mobile terminal when an allowance for starting text communication is received from the network, after a packet communication channel has been established with the network, or selects an e-mail communication with the second mobile terminal when a rejection for starting text communication is received from the network, after a packet communication channel has been established with the network, and (c) a transmission unit which either transmits text communication data when text communication was selected by the judgment unit, or transmits an e-mail when e-mail communication was selected by the judgment unit. The mobile communication system automatically makes e-mail communication, even if text communication cannot be made.

34 Claims, 6 Drawing Sheets

MOBILE COMMUNICATION SYSTEM AND MOBILE TERMINAL

BACKGROUND OF THE INVENTION

1. Field of the Invention

The invention relates to a mobile communication system, a mobile terminal, and a method of making communication between mobile terminals, and more particularly to a mobile communication system a mobile terminal, and such a method for making communication between a pair of mobile terminals both having e-mail addresses identical to telephone numbers thereof for text communication.

2. Description of the Related Art

For instance, Japanese Unexamined Patent Publication No. 10-136091 has suggested a telephone connection service apparatus for transferring a telephone call to a called party by another route, for example, by e-mail, when a phone call could not be made because the called party is out of a service area, is turned off, or is already during communication.

In this apparatus, the means for receiving a transferred call receives a call that could not be made, transferred from a telephone network, receives both a destination telephone number and a telephone number of a caller from the transferred-call or the caller, converts the destination telephone number by means of a personal data Manager into a log-in ID to be used in an information service center of a mobile terminal to be connected to a telephone line of a called party, makes an e-mail addressed to a mobile terminal corresponding to the log-in ID, listing a telephone number of the caller in the e-mail, and transmits the e-mail to the information service center through e-mail service provided by the information service center.

By employing the above-mentioned apparatus, it is possible for a mobile terminal user to automatically transfer a call that failed because a called party is out of a service area, is turned off, or is busy, to the called party by another route, for example, by e-mail. However, a mobile terminal user could transmit an e-mail without employing the above-mentioned apparatus, when a called party is out of a service area, is turned off, or is busy.

In recent years, there has been known a mobile terminal having an email address that is identical to a phone number thereof for text communication.

For instance, such an e-mail address is obtained by converting a telephone number into an e-mail address by means of a browser. When the mobile terminal has an aforementioned function of an e-mail, it is possible to arbitrarily select text communication or e-mail communication for making communication with an opponent.

However, when a user of a mobile terminal having both the above-mentioned functions of text and e-mail communication uses the mobile terminal to make a call for making text communication, it would not be possible to make text communication, if a called party refuses receipt of a call or if a called party is out of a service area or turned off. When an-attempt to transmit an e-mail in place of making text communication, a user has to operate the mobile terminal to cancel a text communication mode and start an e-mail mode. That is, a user has to carry out troublesome handling.

Japanese Unexamined Patent Publication No. 7-99508 has suggested an e-mail system in which when a telephone call is received, e-mails associated with the received telephone call are automatically displayed in a display unit.

Japanese Unexamined Patent Publication No. 9-135298 has suggested a telephone service system in which a message is stored when a user cannot respond to a call, and the thus stored message is transferred to a predetermined address as an e-mail.

Japanese Unexamined Patent Publication No. 9-247293 has suggested a network terminal in which a message is stored in the terminal when a user is not able to respond to a call. The thus stored message is converted into an e-mail, and the e-mail is transmitted to a predetermined mail address.

SUMMARY OF THE INVENTION

In view of the above-mentioned conventional apparatuses, it is an object of the present invention to provide a mobile terminal system, a mobile terminal, and a method of making communication between mobile terminals, all of which are capable of automatically inactivating a function of text communication and activating a function of e-mail communication to thereby transmit an e-mail, when text communication cannot be made with an opponent.

In one aspect of the present invention, there is provided a mobile communication system for communication over a network between a first mobile terminal as a transmitter and a second mobile terminal as a receiver both having a function of packet communication and an e-mail address associated with a telephone number for text communication, the first mobile terminal including (a) a calling unit which transmits a request to the network for registration of packet communication, in order to start text communication with the second mobile terminal, (b) a judgment unit which either selects text communication with the second mobile terminal when an allowance for starting text communication is received from the network, after a packet communication channel has been established with the network, or selects an e-mail communication with the second mobile terminal when a rejection for starting text communication is received from the network, after a packet communication channel has been established with the network, and (c) a transmission unit which either transmits text communication data when text communication was selected by the judgment unit, or transmits an e-mail when e-mail communication was selected by the judgment unit. The mobile communication system automatically makes e-mail communication, even if text communication cannot be made.

In accordance with the present invention, if the first mobile terminal receives a response indicative of rejection to make text communication, the judgment unit of the first mobile terminal automatically switches a function of text communication to a function of e-mail communication without disconnecting a communication packet channel having been established between the first mobile terminal and the network. Then, the judgment unit transmits an e-mail by means of the transmission unit to a mail address of the second mobile terminal through the network.

It is preferable that the network (a) establishes a packet communication channel with the first mobile terminal and makes a response to the first mobile terminal in response to the request, (b) pages the second mobile terminal, (c) establishes a packet communication with the second mobile terminal and makes a response to the second mobile terminal in response to a request made by the second mobile terminal to register packet communication, (d) transmits a signal to the second mobile terminal after the response was made to the second mobile terminal, to confirm whether the second mobile terminal starts or rejects text communication with the first mobile terminal, (e) receives a response from the second mobile terminal and transfers the response to the first mobile terminal, (f) receives text communication data from the first mobile terminal and transmits the thus received text communication data to the second mobile terminal, and (g) disconnects the packet communication channel after transmitting the text communication data to the second mobile terminal.

It is preferable that the second mobile terminal (a) transmits a request to register packet communication, when pages by the network, (b) makes a response to a signal transmitted from the network which signal asks the second mobile terminal whether the second mobile terminal starts or rejects text communication with the first mobile terminal, (c) receives and transmits text communication data, and (d) receives an e-mail from the first mobile terminal.

It is preferable that the e-main addresses of the first and second mobile terminals are obtained by converting telephone numbers of the first and second mobile terminals through a browser.

It is preferable that the network (a) receives and temporarily stores text communication data transmitted from the first mobile terminal after the request has been received from the first mobile terminal, and (b) transmits the thus stored text communication data, to the second mobile terminal, when the response has been received from the second mobile terminal.

It is preferable that the network makes a response to the first mobile terminal which response indicates that the second mobile terminal is out of a service area, when the request is not received from the second mobile terminal, even if the second mobile terminal is paged a predetermined number of times, and wherein the judgment unit of the first mobile terminal selects e-mail communication in place of text communication on receipt of the response.

There is further provided a mobile communication system for communication over a network between a first mobile terminal as a transmitter and a second mobile terminal as a receiver both having a function of packet communication and an e-mail address associated with a telephone number for text communication, wherein if the second mobile terminal rejects to make text communication with the first mobile terminal, the first mobile terminal inactivates a text communication function and activates an e-mail communication function to thereby transmit an e-mail to the second mobile terminal through the network without disconnecting a communication packet channel having been already established between the first and second mobile terminals.

In another aspect of the present invention, there is provided a mobile terminal including (a) a transceiver unit which has a function of receiving and transmitting text communication data in packet and a function of receiving and transmitting an e-mail in packet, and which has an e-mail address associated with a telephone number of the transceiver, (b) an interface through which text communication data and an e-mail can be made by a user, (c) a display unit for displaying the text communication data and e-mail, (d) a first controller which is activated when the mobile terminal is called or when the mobile terminal makes a response to start text communication, and which transmits text communication data through the transceiver unit and displays text communication data received through the transceiver unit, on the display unit, (e) a second controller which transmits an e-mail input through the interface, and displays an e-mail received through the transceiver unit, on the display unit, and (f) a third controller which keeps the first controller to operate to continue transmission of text communication data, when an allowance for starting text communication is received from an opponent, and which inactivates the first controller and activates the second controller to thereby transmit an e-mail, when a rejection against starting text communication is received from an opponent.

In accordance with the present invention, when the second mobile terminal makes a response to reject text communication in response to a request from the first mobile terminal for making text communication, the first controller having been already activated is inactivated, and instead, the second controller is activated to thereby transmit an e-mail to the second mobile terminal.

It is preferable that the mobile terminal further includes a memory which stores addresses.

It is preferable that the mobile terminal further includes a workstation which stores text communication data.

It is preferable that the third controller inactivates the first controller and activates the second controller to thereby transmit an e-mail, when the third controller receives a signal indicating that an opponent is out of a service area.

It is preferable that the second controller transmits a request to cancel packet communication registration to the network through the transceiver unit when an e-mail is received, and disconnect packet communication channel.

There is further provided a mobile terminal having both a first function of text communication and a second function of e-mail communication, the mobile terminal inactivating the first function and activating the second function when an opponent rejects to make text communication with the mobile terminal, to thereby transmit an e-mail to the opponent in place of text communication data.

In still another aspect of the present invention, there is provided a method of making communication between a mobile terminal and an opponent through network, including the steps of (a) the mobile terminal transmitting text communication data to the opponent through the network, (b) the opponent making a response indicating of rejection to make text communication with the mobile terminal, and (c) the mobile terminal inactivating a function of data communication and activating a function of e-mail communication, to thereby transmit an e-mail to the opponent in place of the text communication data.

It is preferable that the method further includes the step of continuing text communication between the mobile terminal and the opponent, if the opponent makes a response indicative of allowing to make text communication with the mobile terminal.

It is preferable that the method further includes the step of annunciating a user that an e-mail has been transmitted to the opponent in place of text communication data.

It is preferable that an e-mail address of the opponent is identical with a telephone number of the opponent.

It is preferable that an e-mail address of the opponent is obtained by converting a telephone number of the opponent through a browser.

It is preferable that the method further includes the step of judging whether the opponent is within a service area or not, and whether the opponent is turned on or not, the steps (b) and (c) being carried out only when the opponent is judged within a service area and is turned on.

There is further provided a method of making communication between a mobile terminal and an opponent through network, including the steps of (a) the mobile terminal transmitting text communication data to the opponent through the network, (b) judging whether the opponent is within a service area or not, and whether the opponent is turned on or not, and (c) the mobile terminal inactivating a function of data communication and activating a function of e-mail communication, to thereby transmit an e-mail to the opponent in place of the text communication data, if the opponent is judged out of a service area or judged to be turned off.

It is preferable that the method further includes the step of annunciating a user that an e-mail has been transmitted to the opponent in place of text communication data.

It is preferable that the method further includes the step of paging the opponent at a predetermined number of times, and judging that the opponent is out of a service area or turned off.

It is preferable that the method further includes the step of annunciating the mobile terminal that the opponent is out of a service area or turned off.

There is still further provided a method of making communication between a mobile terminal and an opponent through network, including the steps of (a) a user selecting text communication or e-mail communication, (b) storing text communication data in a memory, if the user selects text communication, (c) establishing a packet communication channel between the mobile terminal and the opponent, (d) judging whether the opponent allows to receive the text communication data from the mobile terminal, and (e) transmitting the text communication data stored in the memory, to the opponent, if the opponent allows to receive the text communication data from the mobile terminal, and transmitting an e-mail to the opponent in place of the text communication data without disconnecting the packet communication channel, if the opponent does not allow to receive the text communication data from the mobile terminal.

It is preferable that the method further includes the step of judging whether the opponent is within a service area or not, and whether the opponent is turned on or not, the step (e) being carried out only when the opponent is judged within a service area and is turned on.

There is yet further provided a method of making communication between a mobile terminal and an opponent through network, including the steps of (a) a user selecting text communication or e-mail communication, (b) storing text communication data in a memory, if the user selects text communication, (c) establishing a packet communication channel between the mobile terminal and the opponent, (d) judging whether the opponent is within a service area or not, and whether the opponent is turned on or not, and (e) the mobile terminal inactivating a function of data communication and activating a function of e-mail communication, to thereby transmit an e-mail to the opponent in place of the text communication data without disconnecting the packet communication channel, if the opponent is judged out of a service area or judged to be turned off.

The advantages obtained by the aforementioned present invention will be described hereinbelow.

In accordance with the present invention, if the first mobile terminal receives a response from the second mobile terminal which response is indicative of rejection to make text communication with the first mobile terminal, the first mobile terminal inactivates a function of text communication and activates a function of e-mail communication to thereby transmit an e-mail to the second mobile terminal.

Hence, it is no longer necessary for a user to manually inactivate a function of text communication and then manually activate a function of e-mail communication, ensuring enhancement in handling of a mobile terminal.

In accordance with the present invention, when a first mobile terminal having functions of text communication and e-mail communication is to start text communication with a second terminal having the same functions, but the second mobile terminal is out of a service area or turned off, a signal indicating that the second mobile terminal is out of a service area or turned off is transmitted to the first mobile terminal, which in response inactivates a function of text communication and activates a function of e-mail communication. Hence, even when the second terminal is out of a service area or turned off, it is no longer necessary for a user to manually inactivate a function of text communication and then manually activate a function of e-mail communication, ensuring enhancement in handling of a mobile terminal.

The above and other objects and advantageous features of the present invention will be made apparent from the following description made with reference to the accompanying drawings, in which like reference characters designate the same or similar parts throughout the drawings.

DESCRIPTION OF THE PREFERRED EMBODIMENTS

Figure 1:
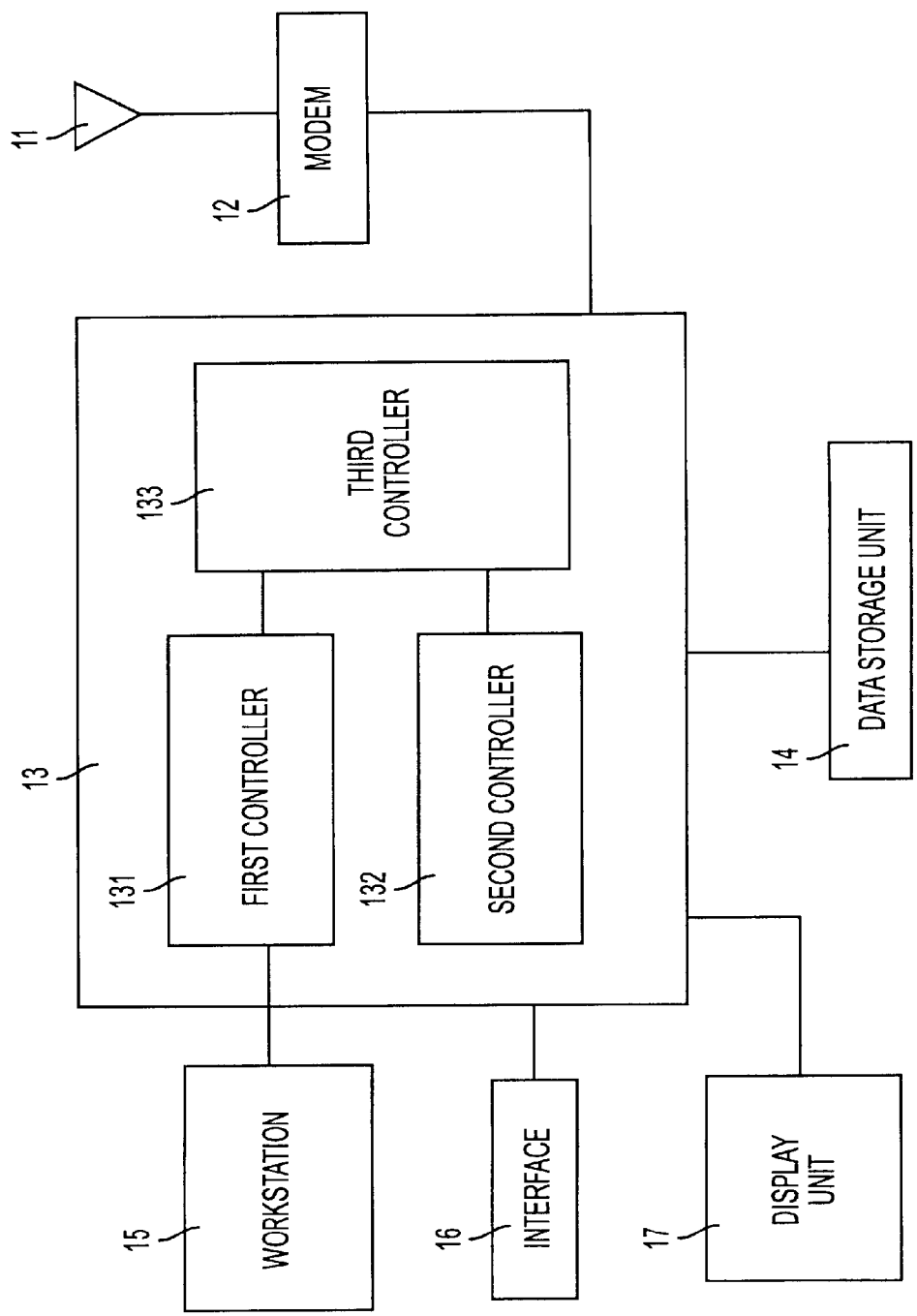
FIG. 1 is a block diagram of a mobile terminal in accordance with the embodiment.

FIG. 1 is a block diagram of a mobile terminal in accordance with a preferred embodiment of the present invention.

The mobile terminal is comprised of an antenna 11 for transmitting data to and receiving data from a network, a modem 12 for modulating data to be transmitted and demodulating received data, a main controller 13 for making overall control of the mobile terminal, a data storage unit 14 for storing an address book including a plurality of addresses, a workstation 15 storing text communication data to be transmitted when text communication is made, an interface 16 through which a user inputs data into the main controller 12, and a display unit 17 for displaying both data input by a user into the main controller 13 through the interface 16 and data received from the network.

The main controller 13 is comprised of a first controller 131 for controlling a function of text communication, a second controller 132 for controlling a function of e-mail communication, and a third controller 133 for activating one of the functions of text communication and of e-mail communication.

This mobile terminal has a function of making packet communication, and also has an e-mail address identical to a telephone number used for text communication. For instance, such an e-mail address can be obtained by converting a telephone number into an e-mail address by means of a browser. The mobile terminal makes communication with another mobile terminal having the same structure, through a network, in arbitrarily selected text communication or e-mail communication, to thereby configure a mobile communication system.

It is now supposed that a first user #1 having a first mobile terminal having the structure as illustrated in FIG. 1 is going to make text communication with a second user #2 also having a second mobile terminal having the structure as illustrated in FIG. 1.

First, the first user #1 starts an operation for text communication through the interface 16. The first controller 131 is then activated, and a screen used for text communication is displayed on the display unit 17. Then, the first user #1 inputs letters for text communication through the interface 16. Text data indicative of input letters is transmitted to the network (not illustrated) through the first controller 131, the modem 12 and the antenna 11. After establishing a packet communication channel with the first mobile terminal, the network further establishes a packet communication channel with the second mobile terminal. Then, the network transmits a request of starting text communication to the second terminal, receives a response from the second terminal, and transmits the thus received response to the first terminal.

The first terminal receives the response from the network through the antenna 11, demodulates the received response at the modem 12, and transmits the thus demodulated response to the main controller 13. The third controller 133 determines whether text communication starts or a function of text communication is inactivated and a function of e-mail communication is activated, in dependence on the response made from the second terminal or the second user #2.

That is, when the response from the second user #2 indicates allowance of starting text communication, the third controller 133 allows the first controller 131 to continue operating in order to start text communication. On the other hand, when the response from the second user #2 indicates rejection of starting text communication, the third controller 133 inactivates the first controller 131, and activates the second controller 132 in order to transmit an e-mail to the second terminal used by the second user #2.

Then, the main controller 13 displays inactivation of the first controller 131 and activation of the second controller 132 on the display unit 17 to thereby inform the first user #1.

Even when the response from the second user #2 indicates rejection of starting text communication, a display screen of the display unit 17 is automatically turned to a screen through which letters for an e-mail are input, without disconnection of the packet communication channel between the network and the first terminal. Thus, the first user #1 can input an e-mail through the interface 16, and transmit the e-mail to an address of the second user #2 through the network.

An operation of the mobile terminal illustrated in FIG. 1 is explained hereinbelow with reference to FIGS. 2 to 4.

Figure 2:
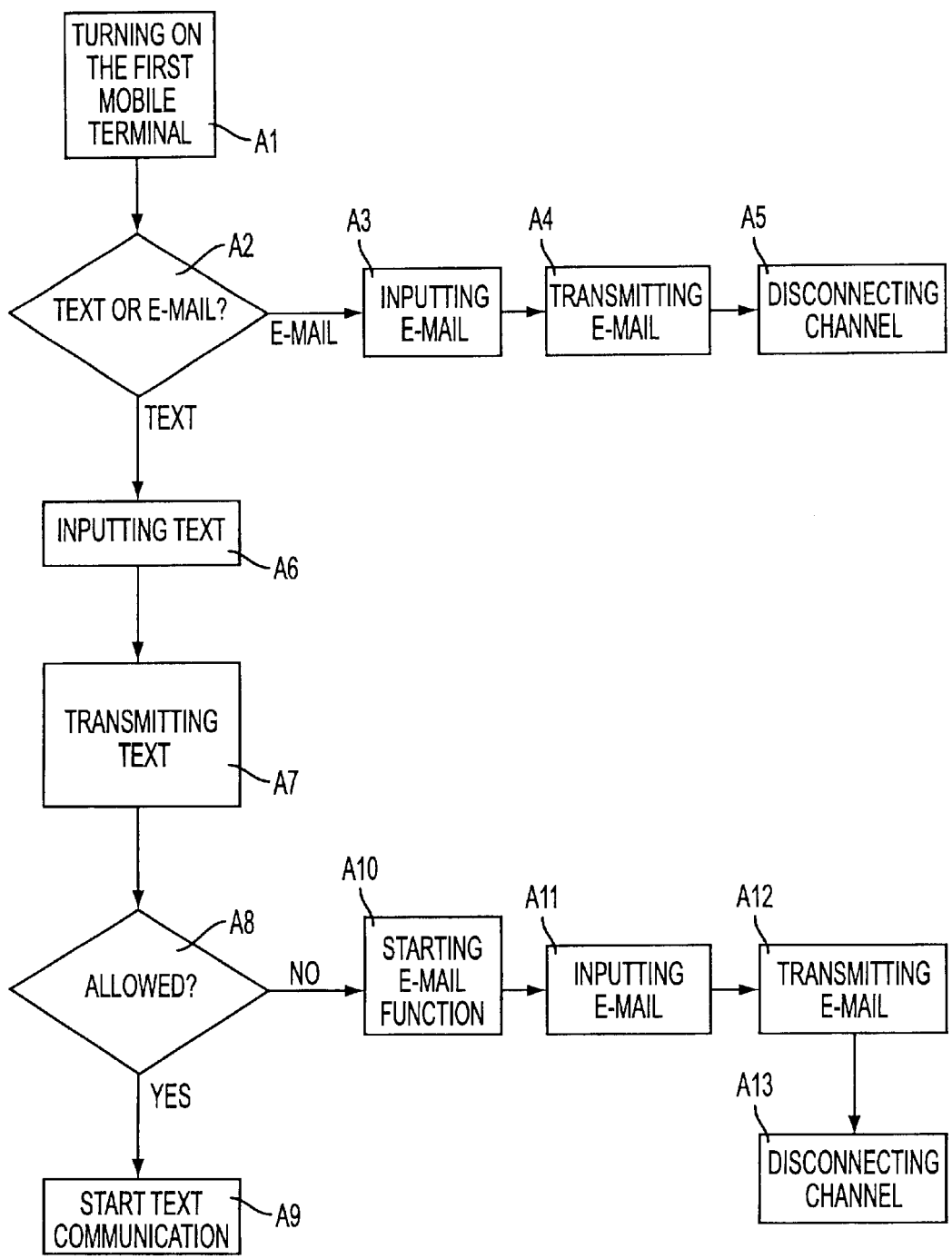
FIG. 2 is a flowchart indicating an operation of the mobile terminal illustrated in FIG. 1.

First, the first user #1 having a first mobile terminal constructed as illustrated in FIG. 1 operates the interface 16 to thereby turn on the first mobile terminal in order to make communication with a second user #2 having a second mobile terminal having the same structure as the structure of the first mobile terminal illustrated in FIG. 1, in step A1 in FIG. 2.

Then, the first user #1 selects text communication or e-mail communication in step A2 in FIG. 2.

When e-mail is selected by the first user #1, the second controller 132 is activated, and a screen used for transmitting an e-mail is displayed on the display unit 17. Thus, the second controller 132 is ready to receive letters for an e-mail to be input by the first user #1 through the interface 16, in step A3 in FIG. 2.

After the second controller 132 has been thus activated, a request to register packet communication is transmitted from the first terminal to the network through the modem 12 and antenna 11. After the network has established a packet communication channel with the second terminal, letters input by the first user #1 through the interface 16 are transmitted to the modem 12 through the second controller 132. The letters are modulated in the modem 12, and transmitted to the network through the packet communication channel. The network transmits the letters or e-mail to the second user #2, in step A4 in FIG. 2.

Then, the network disconnects the packet communication channel, in step A5 in FIG. 2.

On the other hand, when the first user #1 selects text communication, the first controller 131 is activated, and a screen used for text communication is displayed on the display unit 17. The first controller 131 is then ready for receiving letters for text communication to be input by the first user #1 through the interface 16 in steps A6 in FIG. 2.

Letters input by the first user #1 through the interface 16 for text communication are temporarily stored in the workstation 15.

After the first controller 131 has established a packet communication channel with the second mobile terminal through the network, the letters or e-mail are transmitted to the modem 12, and modulated in the modem 12. Then, the thus modulated letters or text are transmitted to the network through the antenna 11 in step A7 in FIG. 2.

After receiving the text, the network transmits a signal to the second user #2 in order to ask the second user #2 whether text communication with the first user #1 starts. The network receives a response from the second user #2, and transfers the response to the first terminal without any change. The response from the second user #2 is received at the antenna 11 and transmitted to the third controller 133 through the modem 12. The third controller 133 judges whether the response from the second user #2 indicates an allowance of starting text communication, in step A8 in FIG. 2.

When the response from the second user #2 indicates an allowance of starting text communication, the third controller 133 operates the first controller 131 and the workstation 15 to thereby start text communication, in step A9 in FIG. 2.

When the response from the second user #2 indicates a rejection of starting text communication, the third controller 133 inactivates the first controller 131 and activates the second controller 132 to thereby start a function of e-mail communication without disconnecting a packet communication channel having been already established, in step A10 in FIG. 2.

Then, the first user #1 inputs some sentences as an e-mail through the interface 16 in step A11 in FIG. 2. The sentences as an e-mail are modulated in the modem 12, and transmitted to the network through the antenna 11. Then, the e-mail is transmitted to the second mobile terminal through the network in step A12 in FIG. 2.

Then, the packet communication channel is disconnected in step A13 in FIG. 2.

Hereinbelow is explained an operation of the mobile communication system at the start of text communication in the aforementioned steps A6 to A9, with reference to FIG. 3.

Figure 3:
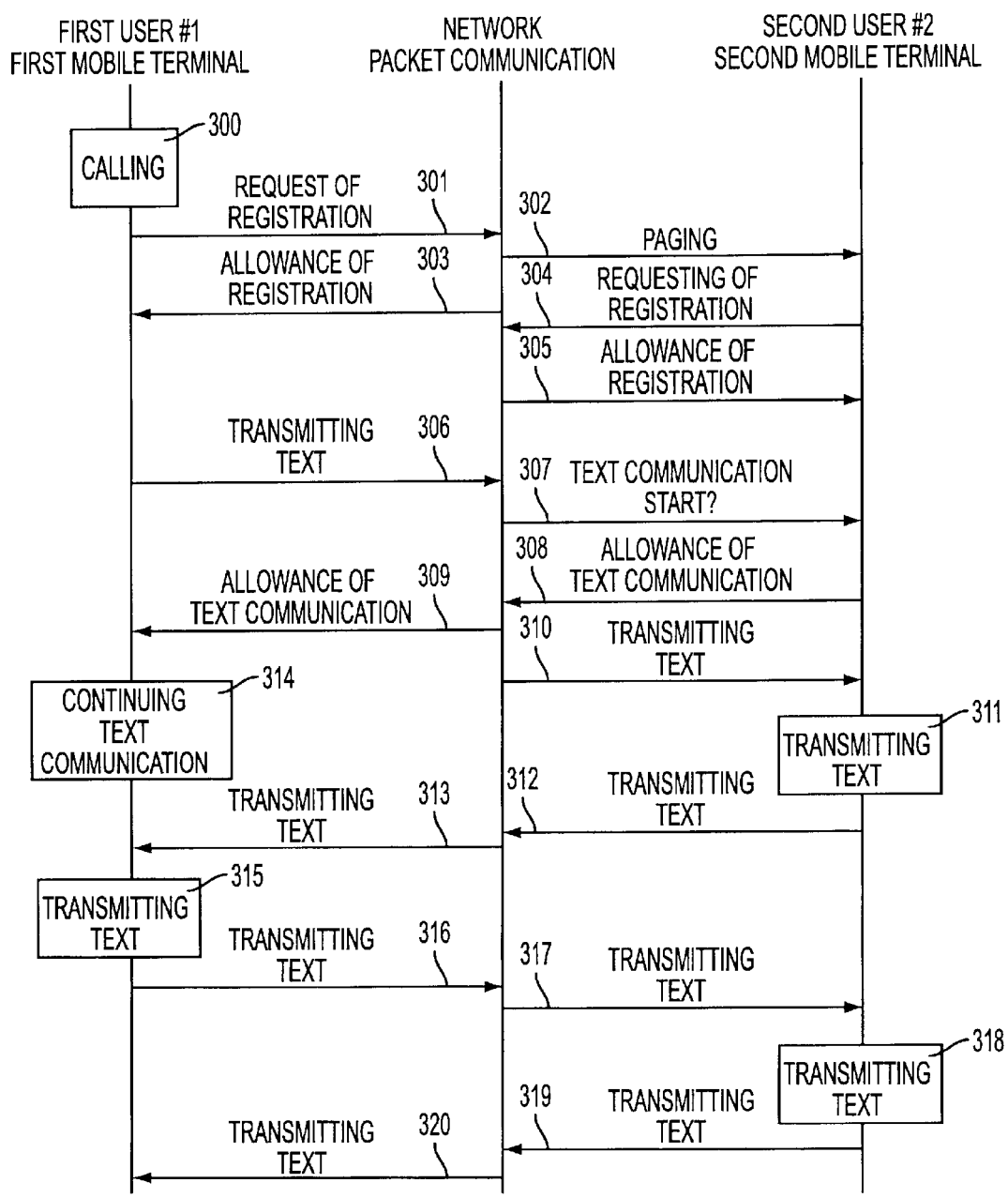
FIG. 3 is a time-sequence chart indicating an operation of the mobile communication system allowing to make text communication between mobile terminals.

When the first terminal of the first user #1 makes a call to the second terminal in step 300 in FIG. 3, the main controller 13 of the first terminal transmits a request to register packet communication to the network through the modem 12 and the antenna 11 in step 301 in FIG. 3.

In response to the request, the network activates a packet communication channel with the first mobile terminal, and transmits an allowance of registering packet communication to the first mobile terminal 1 in step 303 in FIG. 3. At the same time, the network pages the second mobile terminal in step 302 in FIG. 3.

The paged second mobile terminal transmits a request of registering packet communication to the network in step 304 in FIG. 3. After having established a packet communication channel with the second mobile terminal, the network receives the request from the second mobile terminal. Then, the network transmits an allowance of registering packet communication to the second mobile terminal, in step 305 in FIG. 3.

After a packet communication channel has been established, the first mobile terminal transmits the sentences or text stored in the workstation 15, to the network through the modem 12 and the antenna 11 in step 306 in FIG. 3 in the same way as explained in step A7 in FIG. 2.

When the network receives the text data, the network transmits an inquiry signal to the second mobile terminal 2 to ask whether text communication starts or not, in step 307 in FIG. 3.

If the second mobile terminal transmits an allowance to start text communication to the network in response to the inquiry signal in step 308 in FIG. 3, the network transmits an allowance to start text communication to the first mobile terminal in step 309 in FIG. 3, as well as transmits the text communication data stored in the workstation 15, to the second mobile terminal in step 310 in FIG. 3.

The second user #2 receiving the text communication data deciphers letters in the received text communication data, on a screen of the display unit 17 of the second mobile terminal, and starts text communication in response thereto, in step 311 in FIG. 3. The second mobile terminal transmits text communication data input by the second user #2 through the interface 16, to the network in step 312 in FIG. 3. When the network receives the text communication data from the second mobile terminal, the network transmits the text communication data to the first mobile terminal in step 313 in FIG. 3.

When the first mobile terminal receives the allowance to start text communication that was transmitted from the network in step 309, the third controller 133 allows to continue text communication, in step 314 in FIG. 3. When the first mobile terminal receives the text communication data from the second mobile terminal through the network in step 313, the first mobile terminal deciphers letters in the text communication data transmitted from the second mobile terminal, on a screen of the display unit 17, and makes a response, that is, transmits text communication data to the second mobile terminal, in step 315 in FIG. 3.

The first mobile terminal transmits the text communication data input by the first user #1 through the interface 16, to the network in step 316 in FIG. 3. When the network receives the text communication data from the first mobile terminal, the network transmits the thus received text communication data, to the second mobile terminal in step 317 in FIG. 3. The second user #2 receiving the text communication data deciphers letters or text in the text communication data transmitted from the first mobile terminal, on a screen of the display unit 17 of the second mobile terminal, and then, transmits text communication data to the network in response thereto, in step 318 in FIG. 3.

That is, the second mobile terminal transmits text transmission data input by the second user #2 through the interface 16, to the network in step 319 in FIG. 3. When the network receives the text communication data from the second mobile terminal, the network transmits the received text communication data to the first mobile terminal 1 in step 320 in FIG. 3.

The same steps as mentioned above are repeatedly carried out, resulting in that text communication containing sentences displayed on the display unit 17 is made between the first and second mobile terminals.

Hereinbelow is explained an operation of the mobile communication system with respect to steps A6 to A8 and A10 to A12 shown in FIG. 2, wherein a response to reject text communication is made, with reference to FIG. 4.

Figure 4:
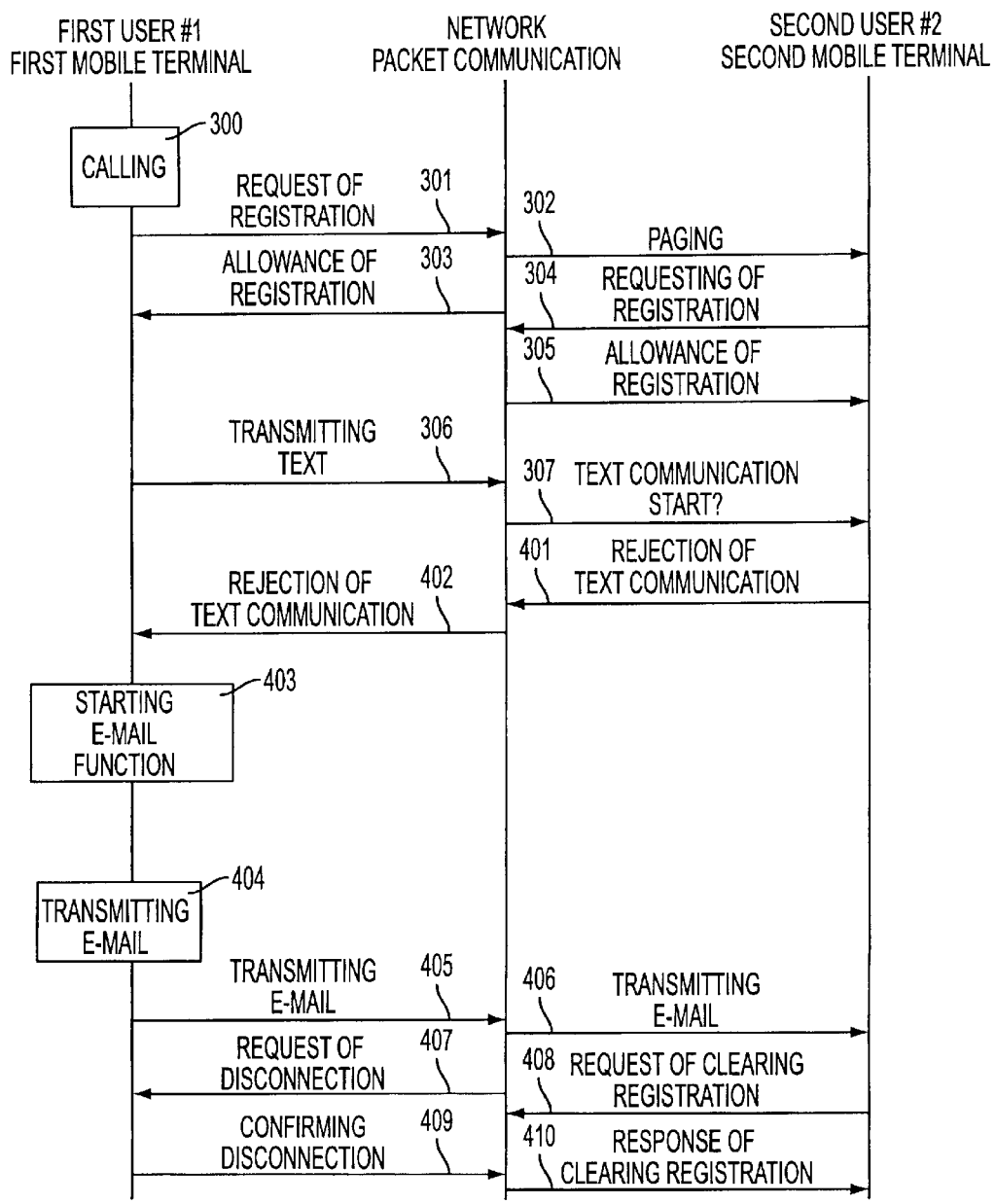
FIG. 4 is a time-sequence chart indicating an operation of the mobile communication system disallowing to make text communication between mobile terminals.

The same reference numbers are used for steps in FIG. 4 that are identical to those in FIG. 3, and an explanation of those steps will be omitted.

Steps 300 to 307 in FIG. 4 are identical to steps 300 to 307 in FIG. 3. That is, the same operation is carried out after the first mobile terminal calls the second mobile terminal for text communication, until the network transmits a signal to the second mobile terminal to ask whether text communication is to start.

If the second mobile terminal transmits a response indicative of rejection of starting text communication, to the network in step 401 in FIG. 4, the network transmits the response of rejection to the first mobile terminal, in step 402 in FIG. 4.

Receiving the response of rejection, the third controller 133 inactivates a function of text communication and instead activates a function of e-mail communication, enabling e-mail communication in step 404 in FIG. 4. That is, the second controller 132 is activated, and a screen on the display unit 17 is switched to a screen used for e-mail communication.

In the present embodiment, the first and second mobile terminals are designed to have telephone numbers used for text communication which are identical mail addresses. Hence, there is no need to change a packet communication channel, and further, there is no need to establish a new packet communication channel even when text communication is stopped and e-mail communication starts.

For instance, the first and second mobile terminals can have telephone numbers identical to e-mail addresses by converting a telephone number thereof into an e-mail address by means of a browser.

When the first user #1 inputs sentences for an e-mail through the interface 16, the second controller 132 transmits the thus input e-mail to the modem 12. The e-mail is modulated in the modem 12, and then, transmitted to the network through the antenna 11 over the aforementioned packet communication channel, in step 405 in FIG. 4.

When the network receives the e-mail, the network transmits the e-mail to the second mobile terminal in step 406 in FIG. 4. Then, the network transmits a request to disconnect the packet communication channel to the first mobile terminal in step 407 in FIG. 4, and disconnects the packet communication channel.

Receiving the e-mail, the second mobile terminal transmits a request to clear registration of packet communication, to the network, in step 408 in FIG. 4. When the network receives a confirmation signal confirming disconnection of packet communication, in step 409 in FIG. 4, and further receives a request to clear registration of packet communication, from the first mobile terminal, the network transmits a response to clear registration of packet communication, to the second mobile terminal, in step 410 in FIG. 4. Thus, the operation ends.

As explained so far, in the present embodiment, when the first mobile terminal receives a response indicative of rejection of starting text communication, the third controller 133 automatically inactivates a function of text communication and activates a function of e-mail communication, enabling to make e-mail communication. As a result, it is no longer necessary to manually inactivate a function of text communication, and then, activate a function e-mail communication, as was done conventionally, thereby improving operability.

Figure 5:
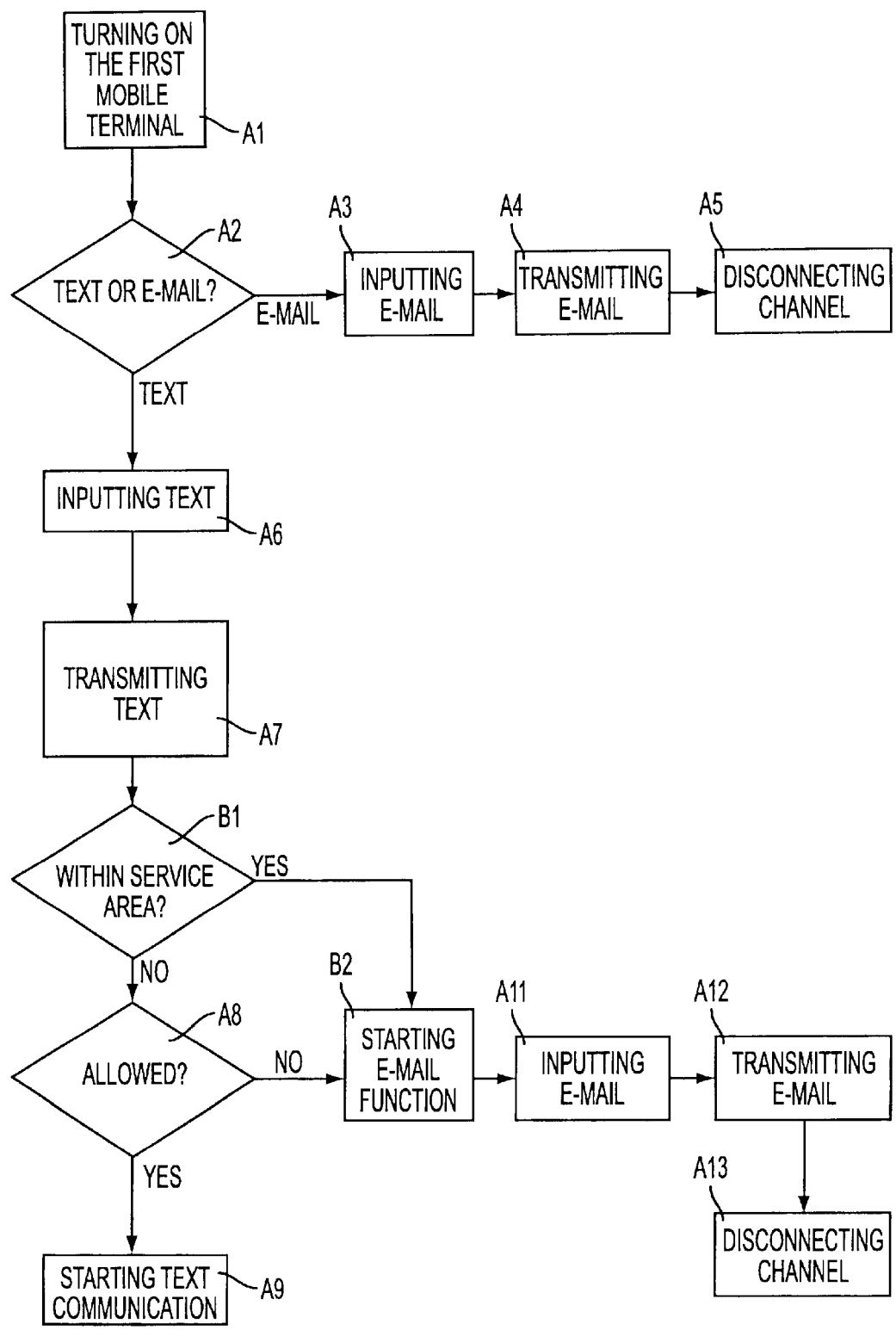
FIG. 5 is a flowchart indicating an operation of the mobile terminal in accordance with another embodiment.

Hereinbelow is explained another embodiment of the present invention, with reference to FIG. 5. FIG. 5 is a flowchart showing an operation of a mobile terminal in accordance with another embodiment of the present invention.

In FIG. 5, the same reference numbers are used for steps identical to those in FIG. 2, and an explanation of those steps will be omitted.

In FIG. 5, steps A3 to A5 wherein the first user #1 select e-mail communication, and steps A6 and A7 wherein the first user #1 select text communication and transmits text communication data, are the same as steps having been explained with reference to FIG. 2.

In the present embodiment, after the first mobile terminal has transmitted text communication data or sentences for an e-mail to the second mobile terminal, the first mobile terminal judges both whether the second mobile terminal 2 is within a service area where communication can be made between the first and second mobile terminals, and whether the second mobile terminal is turned on, in step B1 in FIG. 5.

If the first mobile terminal judges that the second mobile terminal is within a service area, the same steps as those in FIG. 2 are carried out.

On the other hand, if the first mobile terminal judges that the second mobile terminal is not within a service area or that the second mobile terminal is turned off, the third controller 133 of the first mobile terminal inactivates a function of text communication, and instead, activates a function of e-mail communication, in step B2 in FIG. 5.

After a function of e-mail communication has been activated, an e-mail is transmitted to the second mobile terminal in steps A11 and A12 in the same way as those in FIG. 2, and disconnects a packet communication channel in step A13 in FIG. 5.

Hereinbelow is explained an operation of the mobile communication system when the second mobile terminal is out of a service area or is turned off, with reference to FIG. 6.

Figure 6:
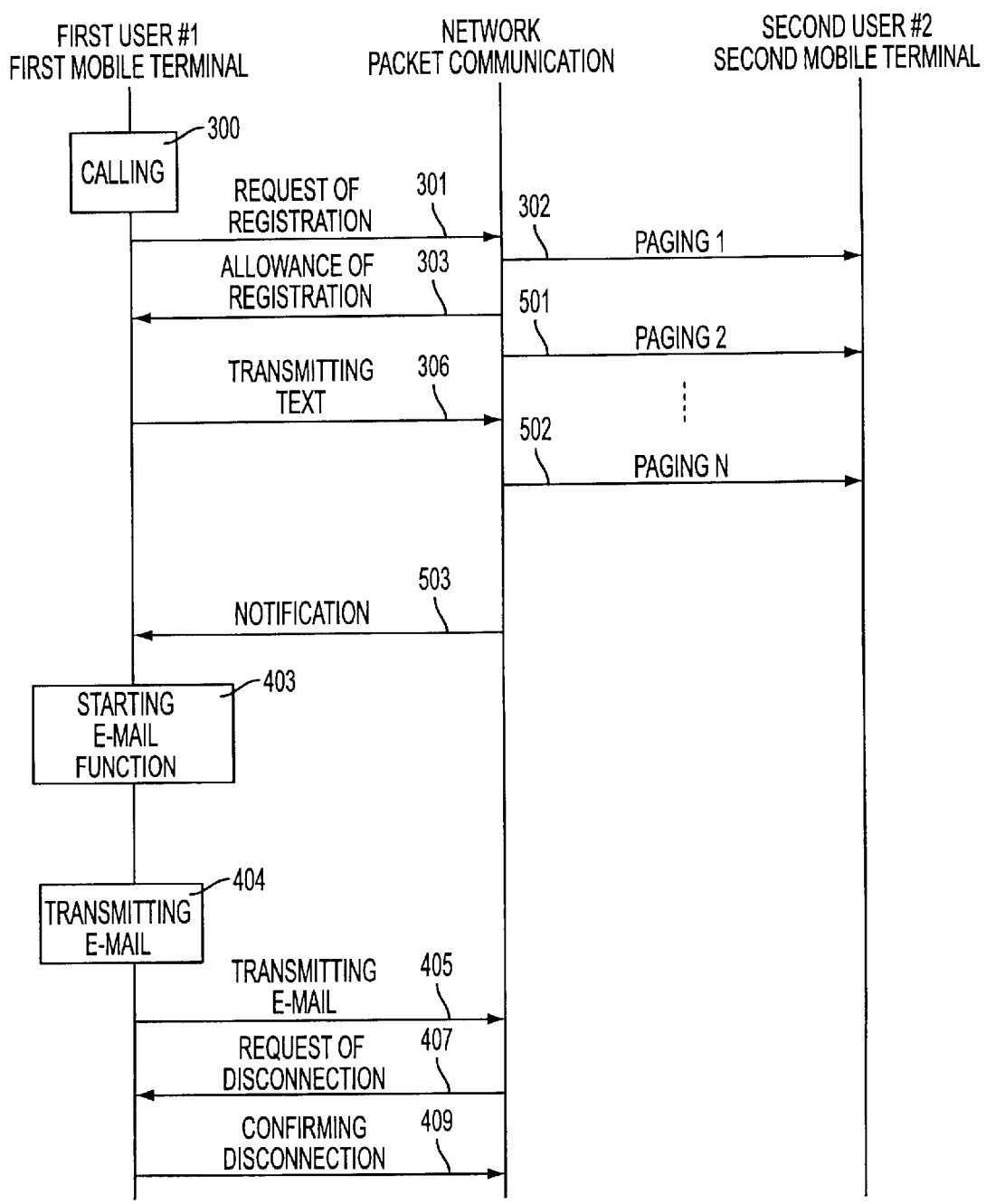
FIG. 6 is a time-sequence chart indicating an operation of the mobile communication system in the case that one of mobile terminals is out of a service area or turned off.

In FIG. 6, the same reference numbers are used for steps identical to those in FIG. 3, and an explanation of those steps will be omitted.

In FIG. 6, when the first mobile terminal of the first user #1 calls the second mobile terminal in order to start text communication with the second user #2 in step 300 in FIG. 3, the main controller 13 of the first mobile terminal transmits a request of registering packet communication to the network through the modem 12 and the antenna 11, in step 301 in FIG. 3.

In response to the request, the network activates a packet communication channel with the first mobile terminal, and then, transmits an allowance of registering packet communication to the first mobile terminal in step 303 in FIG. 3. At the same time, the network pages the second mobile terminal in step 302 in FIG. 3.

However, if the second mobile terminal is out of a service area or is off, a request of registering packet communication is not transmitted to the network from the second mobile terminal. Hence, the network continues paging the second mobile terminal up to a maximum of N times where N is a predetermined positive integer, until the network receives the request, in steps 501 and 502 in FIG. 6.

When the network is still not able to receive the request from the second mobile terminal, even if the second mobile terminal has been paged N times, the network determines that the second mobile terminal is out of a service area or is turned off, and then, notifies the first mobile terminal that the second mobile terminal is out of a service area or is turned off, in step 503 in FIG. 6.

While the second mobile terminal was being paged N times, text communication data is transmitted to the network from the first mobile terminal, and is stored in the network in step 306 in FIG. 6.

When the first mobile terminal receives the above-mentioned notification that the second mobile terminal is out of a service area, the third controller 133 of the first mobile terminal determines that it is not possible to start text communication, and automatically inactivates a function of text communication and activates a function of e-mail communication, in step 504 in FIG. 6, enabling to make e-mail communication in step 505 in FIG. 6. In other words, the third controller 133 inactivates the first controller 131 and activates the second controller 132, and at the same time, a screen on the display unit 17 is switched to a screen used for e-mail communication.

When the first user #1 inputs sentences for an e-mail through the interface 16, the second controller 132 transmits the thus input e-mail text to the modem 12. The e-mail text is modulated in the modem 12, and then, transmitted to the network through the antenna 11 over the aforementioned packet communication channel in step 506 in FIG. 6.

When the network receives the e-mail, the network transmits a request to disconnect packet communication to the first mobile terminal in step 507 in FIG. 6, and disconnects the packet communication channel. The first mobile terminal transmits a signal indicating that the packet communication has been disconnected, to the network, in step 508 in FIG. 6.

The aforementioned mobile terminals in the embodiments are designed to have functions of text communication and e-mail communication. However, it should be noted that the mobile terminals may be designed to additionally have other functions such as a function as a telephone.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 11-226200 filed on Aug. 10, 1999 including specification, claims, drawings and summary is incorporated herein by reference in its entirety.

What is claimed is:

1. A mobile communication system for communication over a network between a first mobile terminal as a transmitter and a second mobile terminal as a receiver both having a function of packet communication and an e-mail address associated with a telephone number for text communication, said first mobile terminal comprising:
   (a) a calling unit which transmits a request to said network for registration of packet communication, in order to start text communication with said second mobile terminal;
   (b) a judgment unit which either selects text communication with said second mobile terminal when an allowance for starting text communication is received from said network, after a packet communication channel has been established with said network, or selects an e-mail communication with said second mobile terminal when a rejection for starting text communication is received from said network, after a packet communication channel has been established with said network; and
   (c) a transmission unit which either transmits text communication data when text communication was selected by said judgment unit, or transmits an e-mail when e-mail communication was selected by the judgment unit.

2. The mobile communication system as set forth in claim 1, wherein said network
   (a) establishes a packet communication channel with said first mobile terminal and makes a response to said first mobile terminal in response to said request,
   (b) pages said second mobile terminal,
   (c) establishes a packet communication with said second mobile terminal and makes a response to said second mobile terminal in response to a request made by said second mobile terminal to register packet communication,
   (d) transmits a signal to said second mobile terminal after said response was made to said second mobile terminal, to confirm whether said second mobile terminal starts or rejects text communication with said first mobile terminal,
   (e) receives a response from said second mobile terminal and transfers said response to said first mobile terminal,
   (f) receives text communication data from said first mobile terminal and transmits the thus received text communication data to said second mobile terminal, and
   (g) disconnects said packet communication channel after transmitting said text communication data to said second mobile terminal.

3. The mobile communication system as set forth in claim 1, wherein said second mobile terminal
   (a) transmits a request to register packet communication, when pages by said network,
   (b) makes a response to a signal transmitted from said network which signal asks said second mobile terminal whether said second mobile terminal starts or rejects text communication with said first mobile terminal,
   (c) receives and transmits text communication data, and
   (d) receives an e-mail from said first mobile terminal.

4. The mobile communication system as set forth in claim 1, wherein said email addresses of said first and second mobile terminals are obtained by converting telephone numbers of said first and second mobile terminals through a browser.

5. The mobile communication system as set forth in claim 1, wherein said network
   (a) receives and temporarily stores text communication data transmitted from said first mobile terminal after said request has been received from said first mobile terminal, and
   (b) transmits the thus stored text communication data, to said second mobile terminal, when said response has been received from said second mobile terminal.

6. The mobile communication system as set forth in claim 1, wherein said network makes a response to said first mobile terminal which response indicates that said second mobile terminal is out of a service area, when said request is not received from said second mobile terminal, even if said second mobile terminal is paged a predetermined number of times, and wherein said judgment unit of said first mobile terminal selects e-mail communication in place of text communication on receipt of said response.

7. A mobile communication system for communication over a network between a first mobile terminal as a transmitter and a second mobile terminal as a receiver both having a function of packet communication and an e-mail address associated with a telephone number for text communication,
   wherein if said second mobile terminal rejects to make text communication with said first mobile terminal, said first mobile terminal inactivates a text communication function and activates an e-mail communication function to thereby transmit an e-mail to said second mobile terminal through said network without disconnecting a communication packet channel having been already established between said first and second mobile terminals.

8. A mobile terminal comprising:
   (a) a transceiver unit which has a function of receiving and transmitting text communication data in packet and a function of receiving and transmitting an email in packet, and which has an e-mail address associated with a telephone number of said transceiver;
   (b) an interface through which text communication data and an e-mail can be made by a user;
   (c) a display unit for displaying said text communication data and e-mail;
   (d) a first controller which is activated when said mobile terminal is called or when said mobile terminal makes a response to start text communication, and which transmits text communication data through said transceiver unit and displays text communication data received through said transceiver unit, on said display unit;
   (e) a second controller which transmits an e-mail input through said interface, and displays an e-mail received through said transceiver unit, on said display unit; and
   (f) a third controller which keeps said first controller to operate to continue transmission of text communication data, when an allowance for starting text 15 communication is received from an opponent, and which inactivates said first controller and activates said second controller to thereby transmit an e-mail, when a rejection against starting text communication is received from an opponent.

9. The mobile terminal as set forth in claim 8, further comprising a memory which stores addresses.

10. The mobile terminal as set forth in claim 8, further comprising a workstation which stores text communication data.

11. The mobile terminal as set forth in claim 8, wherein said third controller inactivates said first controller and activates said second controller to thereby transmit an e-mail, when said third controller receives a signal indicating that an opponent is out of a service area.

12. The mobile terminal as set forth in claim 8, wherein said second controller transmits a request to cancel packet communication registration to said network through said transceiver unit when an e-mail is received, and disconnect packet communication channel.

13. A mobile terminal having both a first function of text communication and a second function of e-mail communication, said mobile terminal inactivating said first function and activating said second function when an opponent rejects to make text communication with said mobile terminal, to thereby transmit an e-mail to said opponent in place of text communication data.

14. A method of making communication between a mobile terminal and an opponent through network, comprising the steps of:
(a) said mobile terminal transmitting text communication data to said opponent through said network;
(b) said opponent making a response indicating of rejection to make text communication with said mobile terminal; and
(c) said mobile terminal inactivating a function of data communication and activating a function of e-mail communication, to thereby transmit an e-mail to said opponent in place of said text communication data.

15. The method as set forth in claim 14, further comprising the step of continuing text communication between said mobile terminal and said opponent, if said opponent makes a response indicative of allowing to make text communication with said mobile terminal.

16. The method as set forth in claim 14, further comprising the step of annunciating a user that an e-mail has been transmitted to said opponent in place of text communication data.

17. The method as set forth in claim 14, wherein an e-mail address of said opponent is identical with a telephone number of said opponent.

18. The method as set forth in claim 14, wherein an e-mail address of said opponent is obtained by converting a telephone number of said opponent through a browser.

19. The method as set forth in claim 14, further comprising the step of judging whether said opponent is within a service area or not, and whether said opponent is turned on or not, said steps (b) and (c) being carried out only when said opponent is judged within a service area and is turned on.

20. A method of making communication between a mobile terminal and an opponent through network, comprising the steps of:
(a) said mobile terminal transmitting text communication data to said opponent through said network;
(b) judging whether said opponent is within a service area or not, and whether said opponent is turned on or not; and
(c) said mobile terminal inactivating a function of data communication and activating a function of e-mail communication, to thereby transmit an e-mail to said opponent in place of said text communication data, if said opponent is judged out of a service area or judged to be turned off.

21. The method as set forth in claim 20, further comprising the step of annunciating a user that an e-mail has been transmitted to said opponent in place of text communication data.

22. The method as set forth in claim 20, wherein an e-mail address of said opponent is identical with a telephone number of said opponent.

23. The method as set forth in claim 20, wherein an e-mail address of said opponent is obtained by converting a telephone number of said opponent through a browser.

24. The method as set forth in claim 20, further comprising the step of paging said opponent at a predetermined number of times, and judging that said opponent is out of a service area or turned off.

25. The method as set forth in claim 24, further comprising the step of annunciating said mobile terminal that said opponent is out of a service area or turned off.

26. A method of making communication between a mobile terminal and an opponent through network, comprising the steps of:
(a) a user selecting text communication or e-mail communication;
(b) storing text communication data in a memory, if said user selects text communication;
(c) establishing a packet communication channel between said mobile terminal and said opponent;
(d) judging whether said opponent allows to receive said text communication data from said mobile terminal; and
(e) transmitting said text communication data stored in said memory, to said opponent, if said opponent allows to receive said text communication data from said mobile terminal, and transmitting an e-mail to said opponent in place of said text communication data without disconnecting said packet communication channel, if said opponent does not allow to receive said text communication data from said mobile terminal.

27. The method as set forth in claim 26, further comprising the step of annunciating a user that an e-mail has been transmitted to said opponent in place of text communication data.

28. The method as set forth in claim 26, wherein an e-mail address of said opponent is identical with a telephone number of said opponent.

29. The method as set forth in claim 26, wherein an e-mail address of said opponent is obtained by converting a telephone number of said opponent through a browser.

30. The method as set forth in claim 26, further comprising the step of judging whether said opponent is within a service area or not, and whether said opponent is turned on or not, said step (e) being carried out only when said opponent is judged within a service area and is turned on.

31. A method of making communication between a mobile terminal and an opponent through network, comprising the steps of:
(a) a user selecting text communication or e-mail communication;
(b) storing text communication data in a memory, if said user selects text communication;

(c) establishing a packet communication channel between said mobile terminal and said opponent;

(d) judging whether said opponent is within a service area or not, and whether said opponent is turned on or not; and (e) said mobile terminal inactivating a function of data communication and activating a function of e-mail communication, to thereby transmit an e-mail to said opponent in place of said text communication data without disconnecting said packet communication channel, if said opponent is judged out of a service area or judged to be turned off.

32. The method as set forth in claim 31, further comprising the step of annunciating a user that an e-mail has been transmitted to said opponent in place of text communication data.

33. The method as set forth in claim 31, wherein an e-mail address of said opponent is identical with a telephone number of said opponent.

34. The method as set forth in claim 31, wherein an e-mail address of said opponent is obtained by converting a telephone number of said opponent through a browser.

* * * * *

UNITED STATES PATENT AND TRADEMARK OFFICE
CERTIFICATE OF CORRECTION

PATENT NO. : 6,609,006 B1
DATED : August 19, 2003
INVENTOR(S) : Daisuke Mori

It is certified that error appears in the above-identified patent and that said Letters Patent is hereby corrected as shown below:

Title page,
Item [30], Foreign Application Priority Data, change,
"Oct. 8, 1999 (JP) ................11-226200" to -- Aug. 10, 1999 (JP) ..................
11-226200 --.

Signed and Sealed this

Nineteenth Day of July, 2005

JON W. DUDAS
*Director of the United States Patent and Trademark Office*